Patented June 5, 1923.

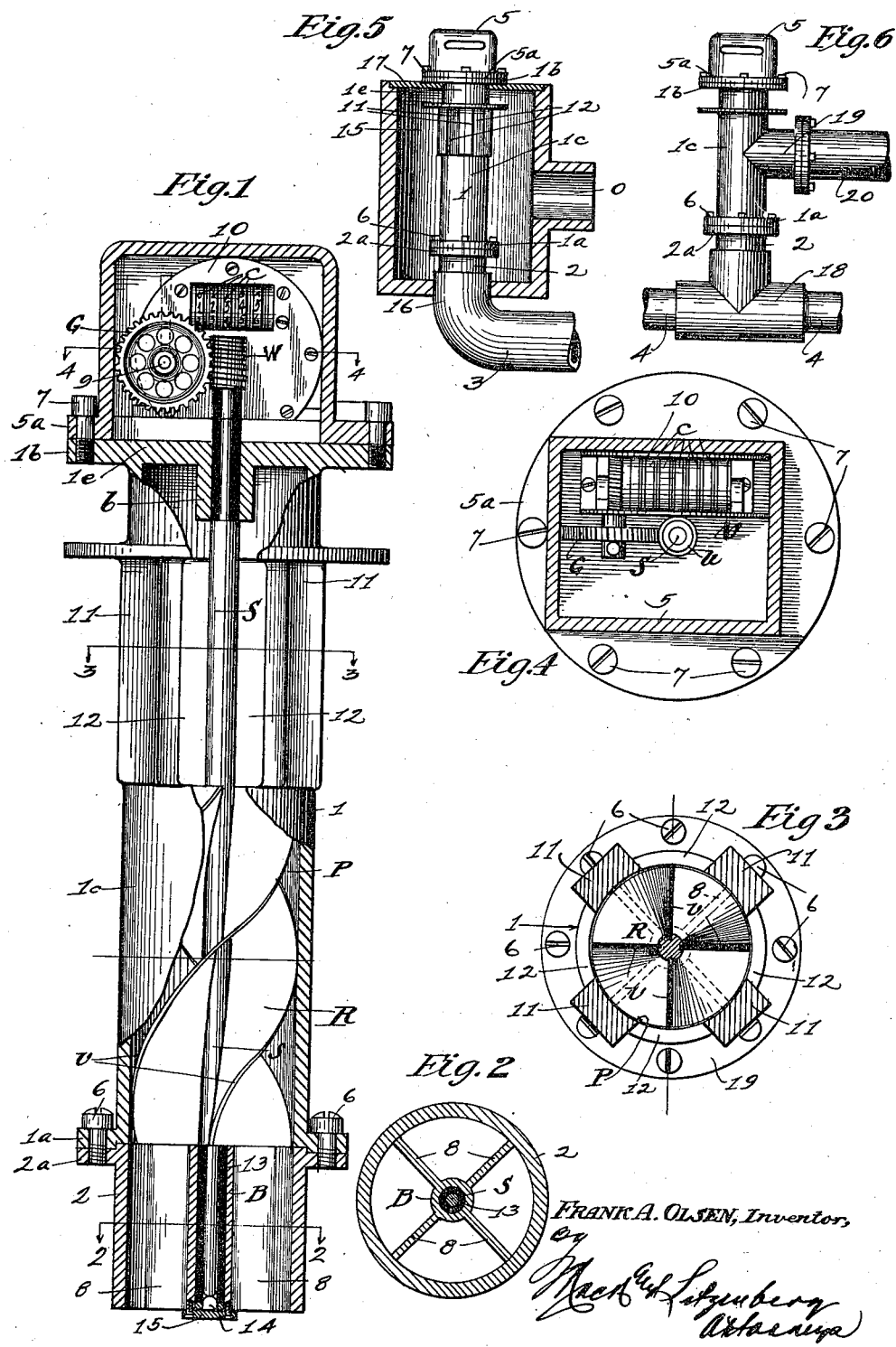

1,457,932

UNITED STATES PATENT OFFICE.

FRANK A. OLSEN, OF SAN GABRIEL, CALIFORNIA.

WATER METER.

Application filed November 5, 1919. Serial No. 337,223.

*To all whom it may concern:*

Be it known that I, FRANK A. OLSEN, a citizen of the United States, and a resident of San Gabriel, in the county of Los Angeles and State of California, have invented new and useful Improvements in Water Meters, of which the following is a specification.

My invention relates to water meters generally and more particularly to a form of meter adapted to be used in irrigating systems for measuring the volume of water discharged for irrigation purposes. It will be understood, however, that my invention may be used with an equal degree of success for water service systems for buildings or for other purposes by making certain minor changes; all of which will be hereinafter more fully described.

Other objects include the provision of a meter in which the water is adapted to flow vertically through a confining chamber in which measuring mechanism is mounted for registering on a suitable meter the flow of water in cubic feet; the provision of a plural vaned helical rotor, of the nature of a propeller, which is adapted to be rotated by the flow of water through said confining chamber; and the provision of suitable renewable bearings for said rotor mountings. Other objects may appear as the description progresses.

In the drawings forming a part of this application and appended hereto, I have shown one practical embodiment of my invention including certain novel details and arrangement of parts for carrying out the above objects and for the purpose of clearly disclosing my invention I have hereinafter referred to said parts by different characters, the same characters being used throughout the specification and in the several views of the drawing, for indicating like parts.

In said drawings:

Fig. 1 is an elevation of my improved meter; partly in section;

Fig. 2 is a horizontal section on line 2—2 of Fig. 1;

Fig. 3 is a horizontal section on line 3—3 of Fig. 1;

Fig. 4 is a horizontal section on line 4—4 of Fig. 1;

Fig. 5 is a sectional elevation of a stand pipe for irrigating purposes in which my meter is mounted;

Fig. 6 is an elevation of a modified form of meter particularly adapted for use in other water service systems.

The meter proper consists of a main body member 1, a bottom nipple 2 adapted to be connected to water supply lines 3, or 4, as the case may be, as indicated in Figs. 5 or 6, and a head 5 adapted to enclose the metering mechanism M. Members 1 and 2 are held together by means of bolts 6, 6, etc., extended through flanges $1^a$ and $2^a$, formed respectively, on members 1 and 2. Members 1 and 5 are similarly held together by means of bolts 7, 7, etc., extended through flanges $1^b$ and $5^a$, formed respectively, on members 1 and 5.

Member 1 has a tubular portion $1^c$ at the lower end thereof which has an internal water passage P in which a rotor R is rotatably mounted on a central shaft, or spindle S. Said rotor has a plurality of helical vanes V, V, etc., adapted to loosely fit the interior of the portion $1^c$ of member 1 and shaft S is rotatably mounted at the bottom in a bearing B formed centrally and integrally with member 2, said bearing being supported from the wall of nipple 2 by means of a plurality of vertical ribs 8, 8, etc. The ribs 8, 8, etc., thus in addition to forming a support for bearing B, also serve to divide the interior of nipple 2 into a plurality of passages of equal area, the number of said passages being preferably made to correspond to the number of vanes V on the rotor R, for reasons to be hereinafter set forth.

The upper end of shaft S has a bearing $b$ formed in the upper end $1^e$ of member 1 and the shaft is extended substantially into the head member 5 where it carries a worm W, adapted to operate a gear G on the transverse shaft 9. Shaft 9 is carried in disc like supports 10, 10, between which the counters $c$, $c$, etc., of the meter M are held for operation, said counters being operably connected with the shaft 9 by means of a second worm gear set $w$.

Intermediate of the tubular portions $1^c$ and $1^e$ of member 1, a plurality of alternating ribs 11, 11, etc., and peripheral apertures 12, 12, etc., are formed in member 1 so that the water which is supplied from the pipe 3 through the interior of portion $1^c$ may be discharged through the apertures 12, 12, etc., the flow of water, as stated, serving to rotate the rotor R and operate the meter mechanism M in the head 5 by means of the connections just described.

I have shown bushings 13, 13, of hard rubber or other suitable material provided in the bearings B and b for the shaft S and said bushings are adapted to be removed so that others may be substituted therefor when they may become worn from constant usage. At the bottom of the bearing B, I have provided a jeweled thrust bearing 14 held in a suitable retainer 15 attached to the bottom bearing B, the jewel used being agate or other suitable stone easily obtainable.

The ribs 8 of nipple 2 serve to break up the volume of water moved vertically through passage P and thus serve as baffles for facilitating the operation of the vanes V of rotor R.

In Fig. 5, I have shown a stand pipe 15 of the character usually provided for irrigating systems for farms and the like. Water is supplied to said stand pipe by means of the service pipe 3 which has an elbow 16 extending vertically into the pipe. My meter is attached to the upper end of said elbow and the head 5 thereof is extended outside of the enclosing cover 17 on the top of the stand pipe. The water is discharged through the apertures 12, 12, etc., into the chamber of the stand pipe and from thence through a lateral opening, or outlet, O, for use on the surface of the ground to be irrigated, or for other purposes.

Referring particularly to Fig. 6, I have shown my meter attached to a T 18 of a service pipe 4 and vertically positioned thereabove, a T outlet 19 being provided on the periphery of member 1 for attachment to a lateral pipe 20, in lieu of the apertures 12, 12, etc., in the form of device previously described. It will be observed from the foregoing description that my device may be made as large or as small as desired or necessary to answer as a meter for all general requirements and that the form of device shown in Fig. 6 lends itself particularly well to modification for different types of water systems. This meter may also be used for liquids other than water, as will be obvious, and with equal success.

It will be understood that in my invention herein set forth and illustrated, I have provided a device capable of metering the smallest possible volume of water. This is possible by means of the vertical position of the body members 1, 2 and 5, for it will be obvious that any volume of water, however small, which is admitted through the nipple 2 to the interior of portion 1$^c$ of body member 1 will gradually fill the interior of portion 1$^c$ and the excess admitted thereafter will be discharged through the apertures 12, 12, etc., or pipe outlet 19 of Fig. 6. Thus the rotor R will be operated at a speed corresponding to the volume of water so discharged. This would not be possible with the meter disposed in a horizontal position.

By the use of the worm gears for operating the metering mechanism M, I have eliminated all undue and unnecessary friction and provided means whereby the shaft S may be rotated with the minimum effort of the smallest volume of water. The metallic members are designed to be made of suitable material, non-corrosive in character, and are adapted to be integrally cast so that a meter may be constructed at a minimum expense and to prevent unnecessary cleaning. When necessary, however, the device may be readily disassembled and reassembled by unskilled persons and without danger to the delicate mechanism M of the meter.

What I claim is:

A water meter having an elongated cylindrical body having a web for closing the upper end of said body and a flange extending outwardly from said web, an outlet portion below said flange having a plurality of elongated peripheral openings formed in the wall of the body, a nipple on the lower end of said body and forming a support therefor, a bearing being centrally formed in said nipple and a bearing also being formed in the web at the upper end of said body, a shaft held in said bearings, a helically vaned rotor carried on said shaft and enclosed by the body, a meter housing attached to the flange on the upper end of said body and arranged to enclose a meter for operable connection with said shaft, said nipple serving as an inlet for the body, and the peripheral openings in said body serving as outlets therefor.

Signed at Los Angeles, county of Los Angeles, and State of California, this 16th day of October, 1919.

FRANK A. OLSEN.

In presence of:
LUTHER L. MACK,
H. M. BRUNDAGE.